Oct. 18, 1966
R. W. MEGOLOFF
3,279,242
ULTRASONIC SEARCH UNIT
Filed Dec. 30, 1963
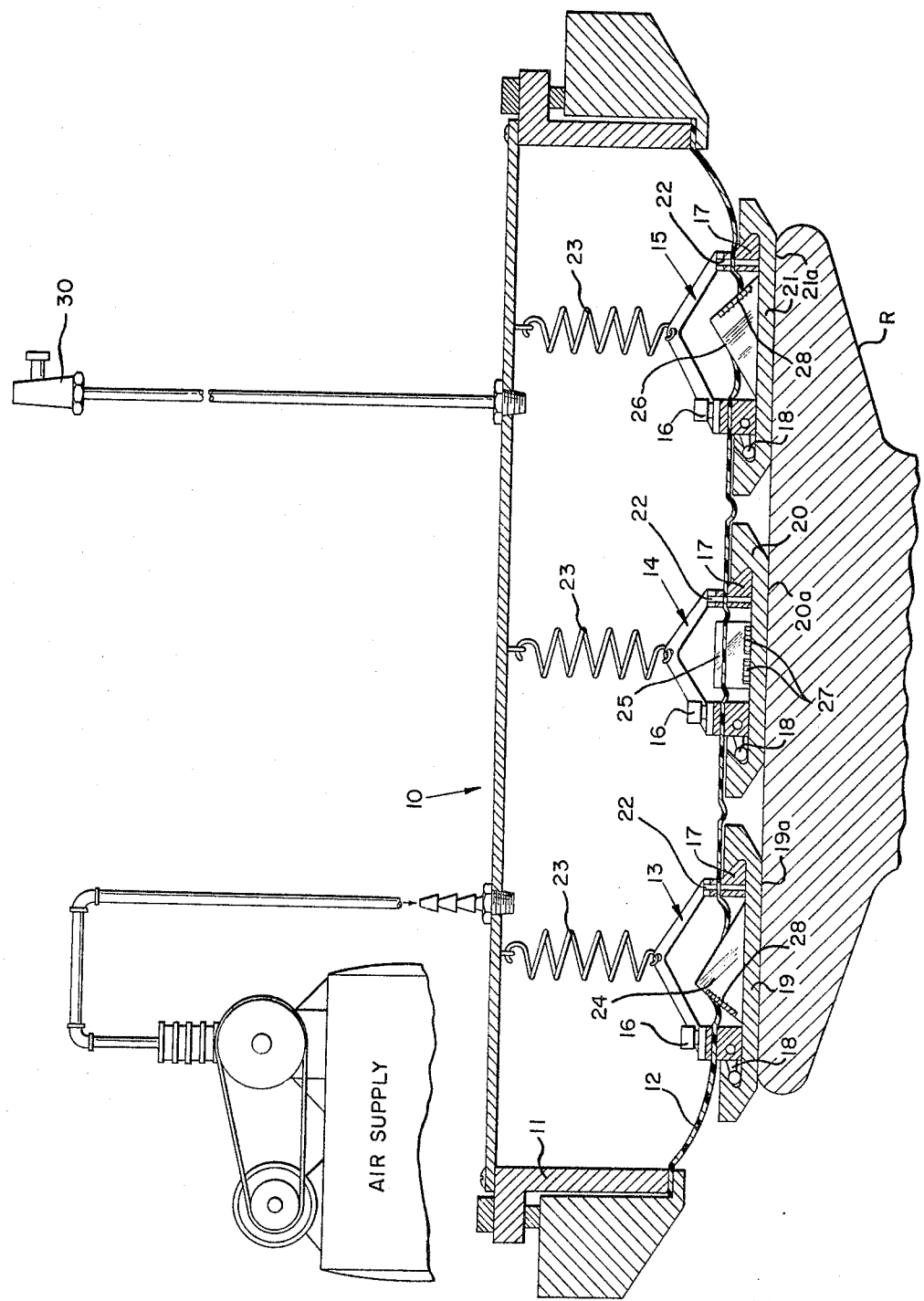
INVENTOR.
RICHARD W. MEGOLOFF
BY
Mellin and Hanscom
ATTORNEYS

United States Patent Office 3,279,242
Patented Oct. 18, 1966

3,279,242
ULTRASONIC SEARCH UNIT
Richard W. Megoloff, 6146 Bennington Drive,
Newark, Calif.
Filed Dec. 30, 1963, Ser. No. 334,142
12 Claims. (Cl. 73—71.5)

This invention relates to testing apparatus, especially that which employs a wear surface for contacting a test object. The invention is particularly useful in connection with ultrasonic search units for the nondestructive testing of materials. The unit hereinafter described is specifically intended to be used for detecting flaws in the rails of a railway.

In brief, this invention involves the construction of an ultrasonic search unit comprising a pressurized chamber having a diaphragm or movable wall for supporting one or more ultrasonic crystal units and associated, replaceable wear shoes. A small supply of regulated air is used to maintain the chamber under pressure and hold each wear shoe against a test object. In addition, the pressure within the chamber normally holds the crystal units against their respective wear shoes for propagating and sensing an ultrasonic signal. The pressurized chamber is adapted to be vented or relieved of its pressure after exceptional wearing of the wear shoe, and for this purpose venting passages are provided in the diaphragm. Each venting passage is normally closed by one of the wear shoes, which presents a wear surface in front of an opening to the vent passage it controls. Thus, as long as the wear shoes remain in proper operating condition, they are held into contact with a test object by the pressure within the chamber. If the shoes become worn, however, the vent passages are opened, thereby releasing the pressure within the chamber. Under these conditions a resilient means, in the form of coil springs, retract the wear shoes from contact with the test object, and the pressure holding the crystal units against the wear shoes is relieved.

The pressure within the chamber must, of course, be sufficient to overcome the resilient support provided by the coil springs during the time that the venting passages are closed. Where a constant regulated supply of air is used to pressurize the chamber, the venting passages must have sufficient capacity to release a higher volume of air than the incoming supply.

One primary object of this invention is to provide an ultrasonic search unit of the kind described having a diaphragm that supports a number of crystal units, said diaphragm being able to contort and systematically adjust one or more of the crystal units and their respective wear shoes.

Another object is to provide an ultrasonic search unit of the kind described having a diaphragm that supports a plurality of crystal units and wear shoes, said crystal units being held in contact with one of said wear shoes and said wear shoes being held in contact with a test surface, each contact force being controlled from a remote location.

Another object of the present invention is to provide an ultrasonic search unit having a wear shoe that may be quickly replaced by a new wear shoe without dismantling the crystal units used therewith.

A further object is to provide an ultrasonic search unit of the kind described wherein both wear shoes and their associated crystal units are automatically retracted when any one of the wear shoes becomes exceptionally worn, thereby preventing damage to components of the search unit.

Another object of the invention is to provide a search unit of the kind described where the deflections of a main supporting body are not readily transmitted either to the shoes or to the crystal units.

A still further object of the invention is to provide a search unit of the kind described that is particularly useful in connection with testing the rails of a railroad line.

Other objects of this invention will become apparent in view of the following detailed description and the accompanying drawings.

In the drawings forming a part of this application there is shown a preferred embodiment of an ultrasonic search unit, generally indicated by the number 10, comprising an enclosed pressure chamber 11 having a flexible diaphragm or movable wall 12. Search unit 10, although shown by itself, is adapted for use on an ultrasonic rail test car, the purpose of such cars being to test for flaws in rails currently in service. The construction of rail test cars and the manner of using an ultrasonic search unit is, of course, well known and forms no part of the present invention.

Referring to the drawings, ultrasonic search unit 10 comprises three shoe holders 13, 14 and 15, which are arranged in essentially a straight line that extends transversely of the rail R, the object being examined. Each shoe holder is of an identical two-piece construction and is clamped to the diaphragm 12 as by means of bolts 16. That portion of the holders which is located on the outside of pressure chamber 11 is formed with a cleat 17 on one end and a pivoted latching dog 18 on the other, said cleat and dog being adapted for engaging recesses in conventional wear shoes 19, 20 and 21 to clamp said shoes against a flat surface of their respective shoe holders. Each wear shoe may be quickly and easily mounted to a shoe holder by fitting the cleat 17 into one recess of the shoe and moving the shoe against the pivoted dog 18 until said dog overrides an opposing force vector and becomes lodged within the opposed recess of the shoe. After being so moved, dog 18 contacts the recess of the shoe, and a resulting force vector is applied thereto in a direction tending to continue its clockwise pivotal movement as shown. Thus, the shoe becomes locked to its holder.

Shoe holders 13, 14 and 15 are formed with a vent passage 22, each having an opening in the flat surface thereof that is normally closed off by the shoe mounted thereto. The openings of passages 22, it will be noted, are disposed in front of shoe wear surfaces 19a, 20a and 21a, respectively. Thus, when the shoe becomes worn to the extent that the openings to passages 22 are no longer closed over, pressure chamber 11 will be vented.

Each shoe holder is resiliently supported and biased vertically upward by a spring member 23. Although each of the springs has sufficient force to support its respective shoe holder (including a portion of the diaphragm 12 and a crystal unit), the pressure within chamber 11 acting against diaphragm 12 further tensions the springs, moving the shoes downwardly and placing each into engagement with the test object R.

Crystal units 24, 25 and 26 are attached to diaphragm 12 and loosely supported by shoes 19, 20 and 21, respectively. The pressure within chamber 11 holds the crystal units against their respective wear shoes. Crystal unit 25 is particularly oriented so that a pair of crystals 27 will propagate an ultrasonic beam directed normal to the wear surface 20a, said crystals to be used in a two-search unit reflection technique. Crystal units 24 and 26, on the other hand, provide single crystals 28, each mounted to an angular Plexiglas wedge 29 for propagating ultrasonic beams at predetermined angles other than perpendicular to the wear surfaces 19a and 21a.

Pressure chamber 11 may be pressurized by use of a conventional air supply, indicated by a legend. The pressure within the chamber is then regulated by means of an adjustable relief valve 30 manually set to release air but to maintain the chamber under pressure at a fixed, predetermined level. It is particularly contemplated that valve 30 may be located at a remote control station from which the pressure of chamber 11 may be modified to adjust the wear-pressure of the shoes against a test object; or the pressure may be substantially reduced so that springs 23 will retract the diaphragm and wear shoes to positions out of contact with the test object.

The weight of the diaphragm, together with each of its supported components, will, of course, depend upon the physical size of the search unit required. Nevertheless, the complete weight of the assembled diaphragm when used as a search unit for testing rails may be less than one pound. The tension force stored in springs 23 must be capable of overcoming this weight factor and support the diaphragm assembly with the wear shoes out of contact with the test object R when any one of the vent passages 22 has been opened (as by reason of a worn or a broken shoe). Springs 23 should also be capable of moving the diaphragm assembly with reasonable responsiveness under such conditions.

In operation, ultrasonic search unit 10 is mounted to a rail test car with each of its shoes 19, 20 and 21 superposed relative to the rail R that is to be tested. Pressurized air is then fed from the air supply into chamber 11, causing the wear shoes 19, 20 and 21 to be moved downwardly against the tension of resilient springs 23 and placing their wear surfaces into contact with the supporting surface of rail R. The pressure within chamber 11 also urges crystal units 24, 25 and 26 into positive surface contact with their respective wear shoes. A desired operating pressure may be obtained by regulating the valve 30. As the wear shoes move along the rail R they will tend to wear, and eventually one of the vent passages 22 will become exposed, thereby releasing a higher volume of air than provided by the regulated air supply. When the pressure within chamber 11 can no longer overcome the tension in springs 23, diaphragm 12 and each of its supported components will be automatically retracted, thus preventing damage to any of the crystal units.

It is to be noted that since flexible diaphragm 12 is the only physical connection between the crystal units and the main body supporting the search unit any deflections or vibrations of the main body are not readily transmitted to the crystal. Since the wear shoes are supported similarly from the diaphragm they, also, are relatively free from any deflections or vibrations of the main body.

As the wear shoes are worn and must be replaced, new wear shoes may be mounted to the holders 13, 14 and 15 without requiring a disassembly or replacement of crystal units 24, 25 and 26; and as the pressure within chamber 11 is restored each of the crystal units will automatically be placed into positive contact with their respective wear shoes without requiring that they be cemented thereto.

It has been found that diaphragm 12 may be made of neoprene, which is impervious to most elements. If materials or objects are to be tested under high temperature conditions, however, a metallic-type diaphragm may be used. It is also possible to provide resilient diaphragms that will serve the function of springs 23 for lifting the wear shoes and crystal units when the pressure chamber is vented.

Although a preferred embodiment of this invention is shown and described, it is to be understood that various changes may be made in the shape, size and arrangement of parts without departing from the spirit of the invention or the scope of the attached claims, and each of such changes is contemplated.

Having thus described my invention, what I claim and desire to secure by Letters Patent is:

1. An ultrasonic search unit for examining test objects, comprising: a pressurized chamber having a movable wall with a vent passage therethrough, a shoe having a wear surface for contacting a test object in front of said vent passage, and a resiliently supported crystal unit mounted intermediate said movable wall and shoe, said crystal unit being held against the force of its resilient support and urged into contact with said shoe by the pressure within said pressurized chamber.

2. The ultrasonic search unit of claim 1 wherein said crystal unit is mounted to said movable wall by a crystal holder and freely supported upon said shoe.

3. The ultrasonic search unit of claim 1 wherein said crystal unit and shoe are both supported from said movable wall, said crystal member being flexibly supported relative to said shoe.

4. The ultrasonic search unit of claim 1 wherein said shoe is detachably mounted to said movable wall by a quick release shoe holder, said crystal unit being flexibly attached to said shoe holder and freely supported upon said shoe.

5. The ultrasonic search unit of claim 1 wherein said crystal member and shoe are both supported from said movable wall, said shoe being detachably mounted thereto by a quick release shoe holder, said crystal unit being flexibly attached to said shoe holder and freely supported upon said shoe, and including a spring connected to said shoe holder for exerting a biasing force sufficient to move said shoe and crystal unit in a direction away from a test object when said pressure chamber is vented.

6. The ultrasonic search unit of claim 1 and further including valve means for venting said pressurized chamber independently of shoe wear.

7. A search unit for examining a test object comprising: a pressurized chamber having a movable wall with a vent passage therethrough, means having a wear surface for contacting a test object in front of said vent passage, said contact means being disposed between said movable wall and a test object, and a biasing means for moving said contact means away from a test object when said chamber is vented.

8. The search unit of claim 7 wherein said movable wall comprises a flexible diaphragm and further including a sensor unit mounted to said flexible diaphragm and held against said contact means by pressure within said pressure chamber.

9. An ultrasonic search unit for examining a test object comprising: a pressurized chamber having a movable wall with a vent passage therethrough, contact means mounted between said movable wall and a test object and having a wear surface for contacting the test object in front of said vent passage, a crystal unit mounted to said movable wall and held against said contact means by the pressure within said chamber, and biasing means opposing the force of pressure acting against said movable wall for moving said contact means and crystal unit away from a test object when said chamber is vented.

10. An ultrasonic search unit for examining test objects and detecting flaws therein, comprising: a pressurized chamber having a flexible diaphragm means including a shoe clamp and holder mounted to said diaphragm and having a passage therethrough for venting said chamber, a shoe mounted on said holder and having a wear surface for contacting a test object in front of a discharge opening to said passage, a crystal unit mounted to said movable wall and disposed intermediate said diaphragm and shoe, said crystal unit being held against said shoe by the pressure within said pressurized chamber, and resilient means biasing said shoe clamp and holder for retracting said shoe and crystal unit when said chamber is vented.

11. An ultrasonic search unit for examining rails and detecting flaws therein, comprising: a pressurized chamber having a flexible diaphragm; means including a set of three shoe holders separately mounted to said diaphragm, said shoe holders being arranged in a straight line and spaced from each other for independent movement, a wear shoe detachably mounted to each of said three shoe holders, each wear shoe having a wear surface for contacting the top surface of a rail, means providing vent passages through said pressurized chamber including port openings that are normally sealed by one of said wear shoes, respectively; a first crystal unit mounted to said diaphragm and held against the intermediate one of the three shoes to propagate signals in a direction essentially normal to the wear surface of its associated shoe; a second crystal unit mounted to said diaphragm and held against a second of the three shoes to propagate signals at an angle relative to the wear surface of its associated shoe; a third crystal unit mounted to said diaphragm and held against the third of the three shoes to propagate signals at an angle relative to the wear surface of its associated shoe; and means for resiliently supporting each of said three shoe holders and retracting said shoes and crystal units when said pressurized chamber is vented.

12. The ultrasonic search unit of claim 9 and further including valve means for venting said pressurized chamber independently of shoe wear.

References Cited by the Examiner
UNITED STATES PATENTS

| | | | |
|---|---|---|---|
| 2,893,239 | 7/1959 | Renaut | 73—67.7 |
| 3,209,582 | 10/1965 | Greenberg et al. | 73—67.8 |
| 3,218,846 | 11/1965 | Joy | 73—71.5 |

RICHARD C. QUEISSER, *Primary Examiner.*

J. BEAUCHAMP, *Assistant Examiner.*